Feb. 24, 1953  F. E. CONDON  2,629,748
PRODUCTION OF 9-CHLORO-OR 9-BROMODECALIN
Filed Dec. 23, 1948
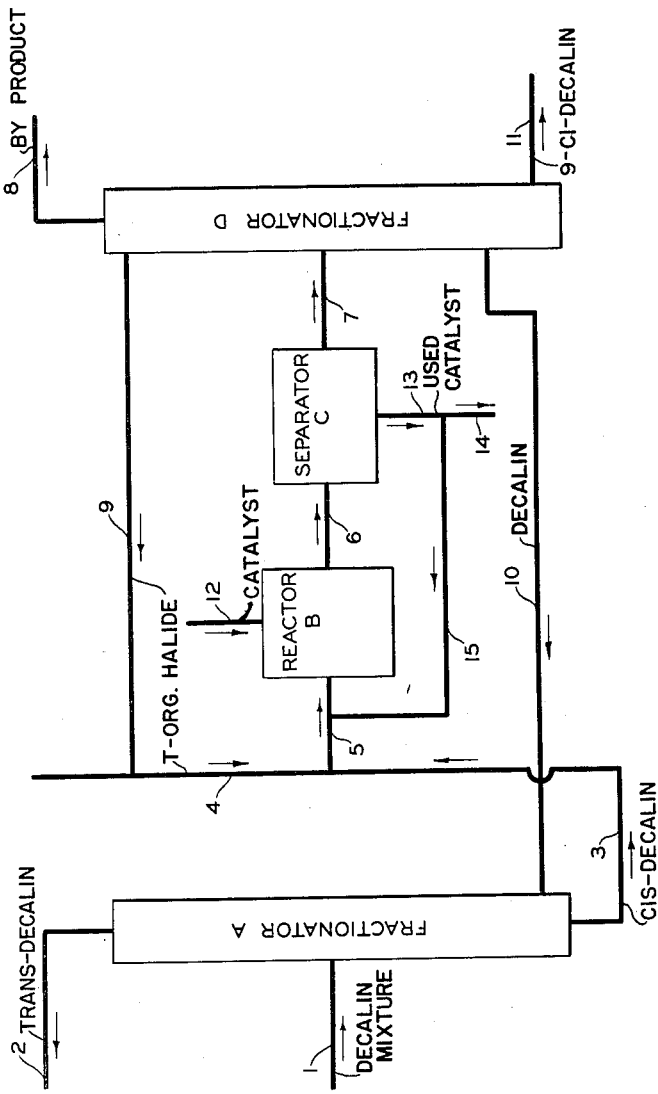
INVENTOR.
F. E. CONDON
BY Hudson & Young
ATTORNEYS Patented Feb. 24, 1953

2,629,748

UNITED STATES PATENT OFFICE 2,629,748

PRODUCTION OF 9-CHLORO- OR 9-BROMODECALIN

Francis E. Condon, Bartlesville, Okla., assignor to Phillips Petroleum Company, a corporation of Delaware Application December 23, 1948, Serial No. 67,055

12 Claims. (Cl. 260—648)

This invention relates to the production of 9-chlorodecalin and 9-bromodecalin. In one of its more specific aspects it relates to a method for the production of 9-chlorodecalin and 9-bromodecalin in high yield. In a still more specific aspect it relates to a method for the production of such a monochlor- and monobrom-derivative of decalin in which the product yield based on reacting material is high and the quantity of process recycle material is held to a minimum.

An object of my invention is to provide a process for the production of 9-chlorodecalin and 9-bromodecalin.

Another object of my invention is to provide a process for the production of 9-chlorodecalin and 9-bromodecalin from a commercially available decalin product.

Still another object of my invention is to provide a process for the production of these monosubstitution derivatives of decalin in which the amount of process recycle material is held to a minimum.

Yet another object of my invention is to provide a process for the production of these mono derivatives of decalin in high yield of a pure product with small losses in undesired by-products.

Still other objects and advantages of my invention will be obvious to those skilled in the art upon reading the following specification.

Broadly speaking, I have discovered that cis-decalin is reactive for the production of 9-chlorodecalin and 9-bromodecalin, and that trans-decalin when exposed to the same reaction conditions as cis-decalin produces little 9-chloro- or 9-bromo-decalin. With trans-decalin side reactions yield some other products. This discovery then makes clear the reason why these monohalogen derivatives can only be produced in yields less than 50%. The cis-decalin and trans-decalin occur in about equal proportions in decalin produced by the hydrogenation of naphthalene.

For the production of monochlorinated derivatives of saturated hydrocarbons, direct chlorination, either with chlorine, or by means of sulfuryl chloride and a peroxide, has the disadvantage that a mixture of many possible isomers usually results. This is because in these reactions there is little difference in the rates of substitution of primary, secondary, and tertiary hydrogen atoms. The relative rates of substitution by chlorine at 300° C. are 1.00:3.25:4.43. In substitution by means of sulfuryl chloride and a peroxide at 85–95° C., the relative reactivities of primary, secondary, and tertiary hydrogens are similar. And since most saturated hydrocarbons have more primary and secondary than tertiary hydrogen atoms, primary and secondary halides are the principal products of such substitution reactions.

On the other hand, in the aluminum halide-catalyzed halogen-hydrogen exchange between an organic halide and a saturated hydrocarbon having a tertiary hydrogen atom, the tertiary hydrogen is preferentially substituted by halogen and a tertiary halide is the principal product. For example, the product from decalin and t-butyl chloride is mainly 9-chlorodecalin, as represented by the following reaction:

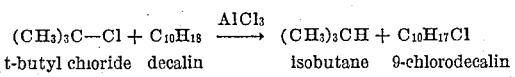

$$(CH_3)_3C-Cl + C_{10}H_{18} \xrightarrow{AlCl_3} (CH_3)_3CH + C_{10}H_{17}Cl$$
t-butyl chloride  decalin  isobutane  9-chlorodecalin I have found that cis-decalin is many times more reactive than trans-decalin in halogen-hydrogen exchange with t-butyl chloride. The presence of trans-decalin in the reaction mixture is therefore undesirable inasmuch as it behaves as an inert solvent, accumulates in recycle streams, and interferes with the halogen-hydrogen exchange reaction between cis-decalin and t-butyl chloride with the result that much t-butyl chloride is consumed in side reactions.

In the following description of the process disclosed in this invention, t-butyl chloride and aluminum chloride are used as examples of donor halide and catalyst, respectively. But it is to be understood that any other readily available, preferably tertiary, organic halide may be employed, provided that its boiling point and the boiling point of the saturated hydrocarbon to which it corresponds are substantially different from the boiling points of the decalins and 9-chlorodecalin. Furthermore, it is to be understood that the process is equally applicable to the production of 9-bromodecalin, and then a tertiary organic bromide is preferably to be employed, and aluminum bromide is preferably the catalyst.

Referring now to the drawing, decalin produced by the hydrogenation of naphthalene and containing approximately equal amounts of cis- and trans-decalin is introduced through a line 1 near the center of a fractionator A, from which substantially pure trans-decalin is removed as an overhead product, via a line 2, and substantially pure cis-decalin is removed as a kettle product via a line 3. The cis-decalin, after admixture with t-butyl chloride from line 4, passes via line 5 to a reactor B in which it is contacted with the catalyst, aluminum chloride, introduced through a line 12, in order to effect halogen-hydrogen exchange between the t-butyl chloride and the cis-decalin. The reaction product then passes through a line 6 to separator C in which the catalyst is removed. The catalyst-free product is then routed via a line 7 to a fractionator D where it is separated into isobutane, which may be removed overhead through a line 8, t-butyl chloride, decalins and chlorodecalin. The t-butyl chloride may be removed as a side stream and recycled through a line 9 and line 4 into the charge to the reactor B. The decalin fraction is returned via a line 10 to a point near the bottom of fractionator A, in which a small amount of trans-decalin that may have been formed as a by-product may be removed. The cis-decalin is passed along with fresh cis-decalin via lines 3 and 5 to the reactor. The 9-chlorodecalin obtained as a product from line 11 may be subjected to further purification if desired. If practicable and desirable, the trans-decalin in line 2 may be subjected to a separate isomerization step (not shown), in order to convert a part of it to cis-decalin. The product of this isomerization stage may then be charged to the fractionator A for separation into its constituent cis- and trans-decalin. Used catalyst is withdrawn from the separator C via line 13, any portion desired recycled to reactor B via line 15 and the remainder passed through line 14 to waste, recovery on other disposal, as desired.

*Specific examples*

Commercial decalin was fractionally distilled in an efficient column and substantially pure cis- and trans-decalins were obtained. The properties of these compounds were: trans-decalin, B. P. 187.8° C.; $n_D^{20}$ 1.4690; cis-decalin, B. P. 196.48° C., $n_D^{20}$ 1.4820. The halogen-hydrogen exchange reactions for which data are given in the table were carried out in a 500-cc. three necked flask fitted with a mechanical stirrer. At the end of the tabulated contact time, the catalyst was washed out with water, the liquid was dried with anhydrous potassium carbonate and was analyzed by fractional distillation.

TABLE

*Halogen-hydrogen exchanges between t-butyl chloride and the decalins*

|  | Expt. No. 1 | Expt. No. 2 |
|---|---|---|
| Temperature, °C | 1 | 1 |
| Contact time, minutes | 1.5 | 1.5 |
| Feed Composition, mol percent: |  |  |
| t-butyl chloride | 52.5 | 53.4 |
| trans-decalin | 27.8 | 46.6 |
| cis-decalin | 19.7 | none |
| Aluminum chloride, wt. percent of feed | 2.2 | 2.7 |
| Product composition, mol percent: |  |  |
| isobutane | 14.5 | 0.61 |
| isopentane | 0.2 | 0.02 |
| t-butyl chloride | 35.2 | 52.2 |
| decalins | 32.5 |  |
| residue | ¹17.6 | ²47.2 |
| Conversion, percent by wt.: |  |  |
| t-butyl chloride | 33 | 2.3 |
| decalins | 31 |  |

¹ Calculated as chlorodecalin.
² Calculated as decalin.

The data of the table show that trans-decalin is relatively inert in halogen-hydrogen exchange with t-butyl chloride, for in Experiment 2, made with pure trans-decalin, the conversion of t-butyl chloride was only 2.3 per cent, while in Experiment No. 1, made under substantially the same conditions, but with cis-decalin present, the conversion of t-butyl chloride was 33 per cent.

It is unlikely that longer contact times would be especially advantageous with the less reactive trans-decalin, for then much of the t-butyl chloride would be consumed in side reactions, for organic halides, and tertiary halides in particular, are rapidly destroyed by aluminum halides. This is brought out by a comparison of the yields of isobutane in the two experiments, based on the t-butyl chloride converted. In Experiment 1, the yield of isobutane (and presumably also the yield of 9-chlorodecalin), based on the t-butyl chloride converted, was 84 per cent; but in Experiment 2, it was only about 50 per cent. The rest of the t-butyl chloride consumed in each experiment apparently went chiefly to high-boiling products.

While in the above experiments 2.2 wt. % and 2.7 wt. % of $AlCl_3$ catalyst based on the feed were used, this catalyst ratio is not intended to be limiting, since other proportions of catalyst may be used. For example, the reaction mixture may be catalyzed with from 1% to 10% $AlCl_3$ by weight based on the feed stock. This same amount of $AlBr_3$ may be used when producing 9-bromodecalin from cis-decalin and t-butyl bromide.

The contact time in minutes in the experiments was given as 1.5 minutes. In like manner, this 1.5 minute contact time is not intended to be limiting since shorter or longer contact times may be used. As stated hereinbefore, longer contact times are not especially desirable since by-product formation or side reactions tend to occur during longer contact times to consume reacting chemicals and to decrease ultimate 9-chlorodecalin yield. Shorter contact times, for example, ½ minute, may be used. However, under certain conditions contact times may be as long as 5 minutes, but the contact times should not be so long as to permit formation of excessive amounts of side reaction products. The formation of such products unnecessarily consumes valuable reaction materials. Contact times of about 1 to 1½ minutes are preferred. When producing 9-bromodecalin from t-butyl bromide in the presence of $AlBr_3$ the time limits and preferred reaction time are about the same as when producing 9-chlorodecalin with $AlCl_3$ as catalyst.

Temperature of reaction used in both experiments was 1° C., and temperatures suitable for this reaction may vary between the approximate limits of −20° C. and +50° C. However, a temperature of about 1° C. is preferred for the production of the 9-chloro- and the 9-bromo-derivatives.

Some more than 1 mol of t-butyl chloride was used per mol of cis-decalin in Experiment No. 1. A preferred ratio of tertiary-butyl-chloride or bromide to cis-decalin is about 1:1, but this ratio may be varied from 0.2:1 to 5:1.

Such auxiliary apparatus as valves, meters, controllers, fractionator packing, reaction stirrer, have not been shown in the drawing nor discussed in the disclosure for purposes of simplicity. The use of such auxiliary apparatus is known by those skilled in the art to be necessary and its installation and operation is well understood.

It will be obvious to those skilled in the art that many variations and alterations in operating conditions may be made and yet remain within the intended spirit and scope of my invention.

Having disclosed my invention, I claim:

1. A method for the production of 9-chlorodecalin in high yield based on the decalin charged to the chlorodecalin producing reaction comprising distilling decalin, produced by the hydrogenation of naphthalene, under conditions of temperature such that trans-decalin is distilled overhead and cis-decalin remains as still bottoms, reacting the separated cis-decalin with tertiary butyl chloride in the presence of aluminum chloride and recovering the 9-chlorodecalin from the reaction mixture.

2. A method for the production of a 9-halogendecalin in high yield based on the decalin charged to the halogen-decalin producing reaction, said halogen selected from the group of halogens consisting of chlorine and bromine, comprising distilling decalin, produced by the hydrogenation of naphthalene, under conditions of temperature such that trans-decalin is distilled overhead and cis-decalin remains as still bottoms, reacting the separated cis-decalin with a corresponding tertiary butyl halide selected from the group of tertiary butyl halides consisting of tertiary butyl chloride and tertiary butyl bromide in the presence of a corresponding aluminum halide selected from the group of aluminum halides consisting of aluminum chloride and aluminum bromide, and recovering the 9-halogen decalin from the reaction mixture.

3. A method for the production of 9-bromo decalin in high yield based on the decalin charged to the bromodecaline producing reaction comprising distilling decalin, produced by the hydrogenation of naphthalene, under conditions of temperature such that trans-decalin is distilled overhead and cis-decalin remains as still bottoms, reacting the separated cis-decalin with tertiary butyl bromide in the presence of aluminum bromide and recovering the 9-bromo-decalin from the reaction mixture.

4. A method for the production of 9-chlorodecalin from a mixture of cis and trans decalins in high yield based on the decalin charged to the chlorodecalin producing reaction comprising distilling said mixture of decalins to produce an overhead product of trans-decalin and a kettle product of cis-decalin, reacting the cis-decalin with tertiary butyl chloride in the presence of aluminum chloride as catalyst, separating the reaction products from the catalyst, distilling the reaction products into a fraction comprising isobutane, a fraction comprising tertiary butyl chloride, a fraction comprising unreacted cis-decalin and a bottoms product comprising 9-chloro-decalin in high yield as the main product of the process.

5. The method of claim 4 in which the fraction comprising tertiary butyl chloride and the fraction comprising cis-decalin are returned to the reacting cis-decalin and tertiary butyl chloride.

6. The method of claim 4 in which a portion of the separated catalyst is returned to the reacting cis-decalin and tertiary butyl chloride.

7. A method for the production of 9-halodecalin from a mixture of cis and trans decalins in high yield based on the decalin charged to the halo-decalin producing reaction, comprising distilling said mixture of decalins to produce an overhead product of trans-decalin and a kettle product of cis-decalin, reacting the cis-decalin with a corresponding tertiary butyl halide selected from the group of tertiary butyl halides consisting of tertiary butyl chloride and tertiary butyl bromide in the presence of a corresponding aluminum halide selected from the group of aluminum halides consisting of aluminum chloride and aluminum bromide as catalyst, separating the reaction products from the catalyst, distilling the reaction products into a fraction comprising isobutane, a fraction comprising tertiary butyl halide, a fraction comprising unreacted cis-decalin and a bottoms product comprising said 9-halo-decalin in high yield as the main product of the process.

8. The method of claim 7 in which the fraction comprising said tertiary butyl halide and the fraction comprising cis-decalin are returned to the reacting cis-decalin and tertiary butyl halide.

9. The method of claim 7 in which a portion of the separated catalyst is returned to the reacting cis-decalin and tertiary butyl halide.

10. A method for the production of 9-bromodecalin from a mixture of cis and trans decalins in high yield based on the decalin charged to the bromo-decalin producing reaction comprising distilling said mixture of decalins to produce an overhead product of trans-decalin and a kettle product of cis-decalin, reacting the cis-decalin with tertiary butyl bromide in the presence of aluminum bromide as catalyst, separating the reaction products from the catalyst, distilling the reaction products into a fraction comprising isobutane, a fraction comprising tertiary butyl bromide, a fraction comprising unreacted cis-decalin and a bottoms product comprising 9-bromo-decalin in high yield as the main product of the process.

11. The method of claim 10 in which the fraction comprising tertiary butyl bromide and the fraction comprising cis-decalin are returned to the reacting cis-decalin and tertiary butyl bromide.

12. The method of claim 10 in which a portion of the separated catalyst is returned to the reacting cis-decalin and tertiary butyl bromide.

FRANCIS E. CONDON.

REFERENCES CITED

The following references are of record in the file of this patent:

UNITED STATES PATENTS

| Number | Name | Date |
| --- | --- | --- |
| 2,448,156 | Schmerling | Aug. 31, 1948 |

OTHER REFERENCES

Seyer et al., "Jour. Am. Chem. Soc.," vol. 60, pp. 2125–8 (1938).

Bartlett et al., "Jour. Am. Chem. Soc.," vol. 66, pp. 1531–9 (1944).